United States Patent
Fennel et al.

(10) Patent No.: US 11,236,407 B1
(45) Date of Patent: *Feb. 1, 2022

(54) METAL RECOVERY BY LEACHING AGGLOMERATES OF METAL-CONTAINING MATERIAL/PYRITE

(71) Applicant: Rio Tinto Technological Resources Inc., South Jordan, UT (US)

(72) Inventors: Mark James Fennel, South Jordan, UT (US); Ralph Peter Hackl, Mt. Eliza (AU); Paul Leslie Brown, Kiama (AU); Adam James Burley, London (GB); Javiera del Pilar Alcayaga Zuñiga, Santiago (CL); Yure Anton Mladinic Muñoz, Santiago (CL)

(73) Assignee: Rio Tinto Technological Resources Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,487

(22) Filed: Jul. 31, 2020

(51) Int. Cl.
| C22B 15/00 | (2006.01) |
| C22B 1/00 | (2006.01) |
| C22B 3/06 | (2006.01) |
| C22B 1/14 | (2006.01) |

(52) U.S. Cl.
CPC .......... *C22B 15/0067* (2013.01); *C22B 1/005* (2013.01); *C22B 1/14* (2013.01); *C22B 3/06* (2013.01)

(58) Field of Classification Search
CPC .... C22B 1/14; C22B 3/06; C22B 3/08; C22B 15/0067; C22B 15/0071; C22B 19/22; C22B 23/0407; C22B 23/043; C22B 3/18
See application file for complete search history.

(56) References Cited

U.S. PATENT DOCUMENTS

| 5,316,751 | A | * | 5/1994 | Kingsley | ................... C22B 3/18 423/571 |
| 6,926,753 | B2 | | 8/2005 | Faine et al. | |
| 7,491,372 | B2 | | 2/2009 | Faine et al. | |
| 7,575,622 | B2 | | 8/2009 | Crundwell et al. | |
| 7,799,295 | B2 | | 9/2010 | Dreisinger et al. | |
| 7,846,233 | B2 | | 12/2010 | Dixon et al. | |
| 8,012,238 | B2 | | 9/2011 | Kohr | |
| 8,252,086 | B2 | | 8/2012 | Seed et al. | |
| 8,273,237 | B2 | | 9/2012 | Marsden et al. | |
| 8,277,539 | B2 | | 10/2012 | Dixon et al. | |
| 8,388,728 | B2 | | 3/2013 | Hollitt et al. | |
| 8,491,701 | B2 | | 7/2013 | Uhrie et al. | |
| 10,323,296 | B2 | | 6/2019 | Ponce Beoutis et al. | |
| 10,526,681 | B2 | | 1/2020 | Chaiko et al. | |
| 2009/0019970 | A1 | | 1/2009 | Ritchie et al. | |
| 2009/0293608 | A1 | | 12/2009 | Kaercher et al. | |
| 2011/0150729 | A1 | * | 6/2011 | Liu | ........................... C22B 3/42 423/139 |
| 2014/0127789 | A1 | | 5/2014 | Fitzmaurice et al. | |
| 2015/0027901 | A1 | * | 1/2015 | Theodore | .................. C25C 1/12 205/560 |
| 2015/0225809 | A1 | * | 8/2015 | Robertson | ................. C22B 3/18 423/1 |
| 2016/0138128 | A1 | * | 5/2016 | Nicolay | .............. C22B 15/0071 435/262 |

FOREIGN PATENT DOCUMENTS

| CA | 2374509 A1 | 11/2000 |
| PE | 20010310 A1 | 3/2001 |
| PE | 20140641 A1 | 6/2014 |

OTHER PUBLICATIONS

Uhrie, John L., "Pyrite as a stockpile leach-aid", Proceedings of Copper 99-Cobre 99 International Conference, vol. IV—Hydrometallurgy of Copper, The Minerals, Metals & Materials Society (1999), pp. 481-490.

\* cited by examiner

*Primary Examiner* — Steven J Bos
(74) *Attorney, Agent, or Firm* — Banner & Witcoff, Ltd.

(57) ABSTRACT

A method of recovering a metal, such as copper or nickel or zinc or cobalt, from a metal-containing material, such as a metal-containing material that has been categorized by a mine operator as being "non-economic" from the perspective of recovering the metal from the material. Mixing (i) the metal-containing material and (ii) pyrite and forming agglomerates. Leaching agglomerates with a leach liquor, with pyrite generating acid and heat that facilitate recovering the metal from the metal-containing material, and forming a pregnant leach liquor containing metal. Recovering the metal from the pregnant leach liquor.

11 Claims, 1 Drawing Sheet

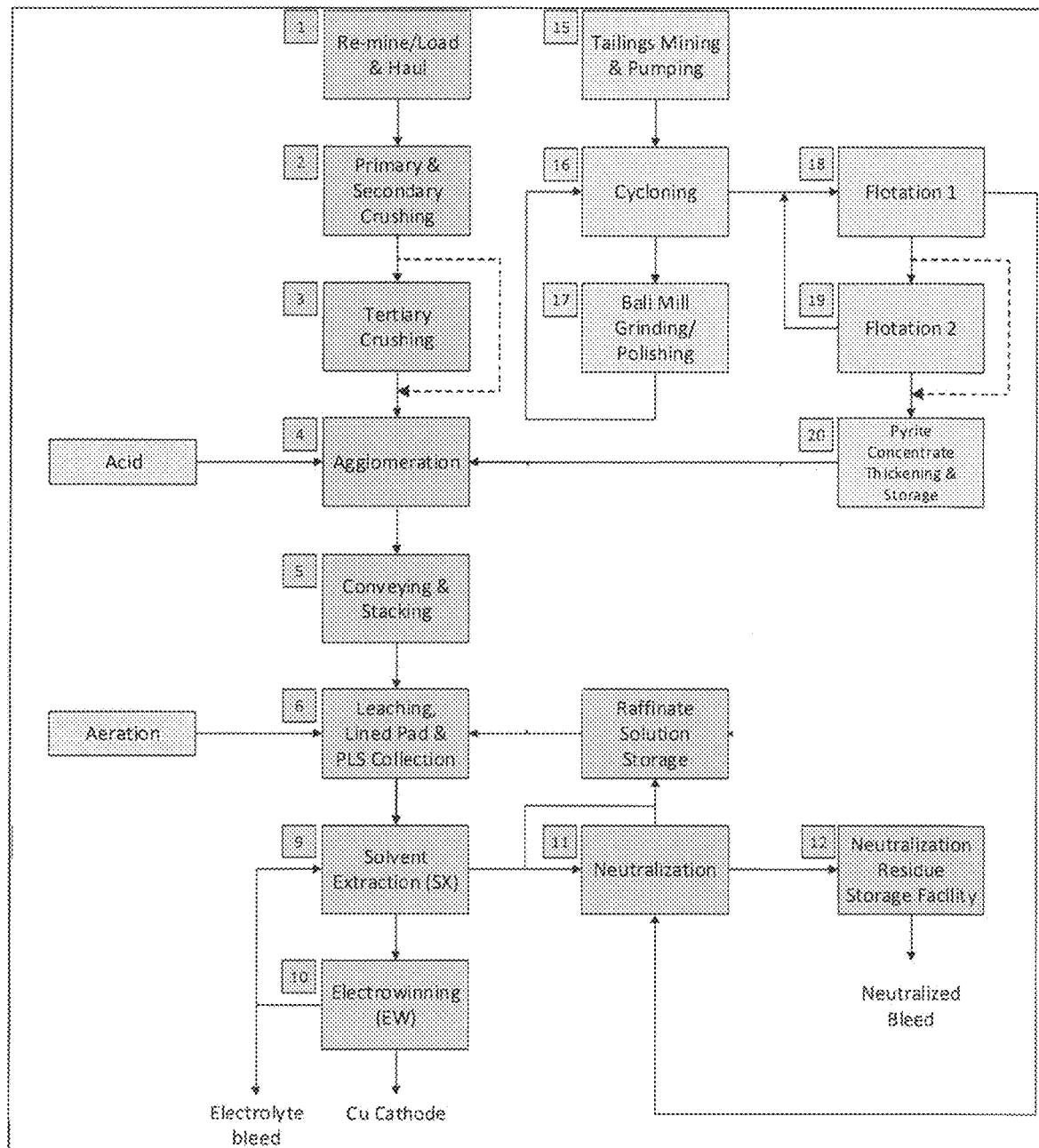

METAL RECOVERY BY LEACHING AGGLOMERATES OF METAL-CONTAINING MATERIAL/PYRITE

TECHNICAL FIELD

The present invention relates to a method of recovering a metal, such as copper or nickel or zinc or cobalt, from a metal-containing material that has been categorized by a mine operator as being "non-economic" from the perspective of recovering the metal from the material.

The non-economic material may be in stockpiles or as-mined metal-containing material or any processed form of the mined material.

The present invention relates particularly, although by no means exclusively, to a heap leaching method that is characterized by leaching a heap of agglomerates of a metal-bearing material and pyrite, typically pyrite that is available in a mine, such as pyrite obtained from mine tailings.

The present invention also relates to a heap that is characterized by a heap containing agglomerates of a metal-containing material and pyrite, typically pyrite that is available in a mine, such as pyrite obtained from mine tailings.

BACKGROUND ART

The technical field of the invention is the production of a metal, such as copper or nickel or zinc or cobalt.

The following description of the invention focuses on copper as one example of a metal.

Copper is an increasingly important metal for the transition to a low carbon-based global economy.

There are substantial capital and operating cost pressures on copper mine operators of well-established and new copper mines that have lower average concentrations of copper in copper-bearing materials than was previously the case.

In many instances, the problem of lower copper concentrations in copper-bearing materials is compounded by the copper being in more refractory copper-bearing minerals than previously, with these minerals being more difficult and expensive to process to recover copper from the minerals.

Mining companies are also very conscious of the importance of operating mines with minimal environmental impact over short and longer terms.

The economics facing copper mine operators mean that there are substantial amounts of metal-containing material, including mined material and processed forms of mined material, that are regarded by copper mine operators as being non-economic from the perspective of recovering the metal from the material that are not being processed at all or are not being processed through all of the downstream processing steps that recover copper from copper-bearing material.

Non-economic copper-bearing material is typically stored in stockpiles that are often described as waste rock stockpiles.

The concentration of copper in non-economic copper-bearing material is not an absolute fixed value and will vary from mine to mine and also in an individual mine over time, having regard to capital and operating costs in the mine and factors external to the mine, such as the overall market for copper.

The invention provides a method of recovering copper from non-economic metal-containing material.

The invention provides a method of recovering other metals, such as nickel or zinc or cobalt, from non-economic metal-containing material.

The above description is not an admission of the common general knowledge in Australia or elsewhere.

SUMMARY OF THE DISCLOSURE

The invention is concerned with maximizing the beneficial use of material produced in a mine, such as a copper mine, but equally a nickel, zinc or cobalt mine or a mine producing two or more of these metals, as other examples, and minimizing the extent to which processing materials, such as reagents, from outside the mine are required.

One advantage of the invention is to provide an opportunity to maximize the recovery of a metal, such as copper or nickel or zinc or cobalt, from a mine and to minimize the costs to do so.

Another advantage of the invention is to provide an opportunity to minimize the environmental impact of the mine.

In broad terms the invention provides a method of recovering a metal, such as copper, nickel or zinc or cobalt, from a metal-containing material, such as a metal-containing material that has been categorized by a mine operator as being "non-economic" from the perspective of recovering the metal from the material, from a mine that includes the steps of:

(a) mixing (i) the metal-containing material and (ii) pyrite and forming agglomerates;

(b) leaching agglomerates from step (a) with a leach liquor, with pyrite generating acid and heat and the acid facilitating leaching metal from the metal-containing material, and producing a pregnant leach liquor containing the metal; and (c) recovering metal from the pregnant leach liquor.

The metal may be any suitable metal.

Examples of suitable metals are copper, nickel and zinc and cobalt.

The metal-containing material may be in any suitable form for the agglomeration step.

The metal-containing material may be in the form of as-mined material or stockpiled material that has been processed to be suitable for the agglomeration step.

The method may include comminuting as-mined or as-stockpiled material and producing a suitable particle size distribution for the agglomeration step.

The comminuting step may include crushing as-mined or as-stockpiled metal-containing material in one or more than one comminution circuit that reduces the size of the material.

The comminuting step may include crushing as-mined or as-stockpiled material successively in primary, secondary and tertiary comminution circuits, as these terms are understood by persons in the copper mining industry.

The comminuting step may include single or multiple crushing steps delivering crushed as-mined or as-stockpiled metal-containing material to produce the material with a desired particle size distribution for the agglomeration step.

The pyrite may be 1-10 wt. % of the total mass of the metal-containing material and pyrite.

The pyrite may be obtained from any suitable source.

Typically, the pyrite source is from the mine.

For example, the pyrite may be in a pyrite-containing slurry, such as tailings of the mine, and the method may include using the slurry directly in the agglomeration step.

By way of further example, the method may include obtaining pyrite by removing pyrite from a pyrite-containing slurry, such as tailings of the mine.

Typically, the pyrite removed from the tailings is in a concentrate form.

The method may include removing pyrite from the tailings in the pyrite removal step and forming an inert stream—i.e. a stream that is less reactive than the input tailings to the pyrite removal method in terms of the amount of pyrite in the inert stream.

The tailings may be processed in the pyrite removal step, for example beneficiated, by any method that recovers and concentrates pyrite from the tailings.

The pyrite removal step may include a size separation step, such as via cyclones or other suitable classification devices, which for example separates larger particles from the remaining fines-containing tailings.

The pyrite removal step may include reducing the size of the larger particles in a size reduction circuit and returning the reduced-sized particles to the size separation step.

The pyrite removal step may include selecting the operating conditions for the size separation step so that pyrite particles in the pyrite-containing material in the remaining tailings have a required particle size distribution for downstream processing of the tailings.

The pyrite removal step may include floating pyrite-containing particles in the remaining tailings and producing (i) pyrite-containing material and (ii) the inert stream.

The pyrite removal step may include thickening and/or filtering the pyrite-containing material and de-watering the material and forming a pyrite-containing concentrate.

The above-described method has the following advantages:

The method makes it possible to extract a metal such as copper or nickel or zinc or cobalt from a metal-containing material that has been categorized by a mine operator as being "non-economic" from the perspective of recovering the metal from the metal-containing material.

When the pyrite is in tailings, the method makes it possible to process tailings that contain pyrite and thereby reduce the volumes of existing tailings dams. This is an important environmental outcome.

The acid and heat generating capacity of pyrite is an advantage in leaching, such as heap leaching, and, for example, can reduce the amount of added acid that is required in the leach liquor.

Moreover, the acid-generating capacity of pyrite means that the pyrite is used beneficially in the leach step and results in a net reduction in pyrite, which is significant from an environmental perspective.

Any amounts of the metal, such as copper, nickel and zinc and cobalt, in the pyrite-containing material is a bonus—it is taken into the heap with pyrite and can be recovered in the heap leaching step.

In addition to producing the above-mentioned pyrite, removing pyrite from tailings produces an inert stream—i.e. a stream that is less reactive than the input tailings to the pyrite removal method in terms of the amount of pyrite in the inert stream. This is beneficial because pyrite in tailings is an environmental problem because pyrite makes the tailings "acid generating tailings" and this is an issue for disposal of the tailings.

The option of adding pyrite-containing tailings directly in agglomeration if they contain sufficient pyrite so that a pyrite removal step is not necessary, is an efficient use of these tailings.

The method can be operated with readily-available and tried and tested equipment.

The method makes it possible to process what has been previously classified as waste materials, namely metal-containing material and tailings, and reduce the environmental impact of these materials as well as optimising the recovery of value from the originally-mined material.

The agglomeration step may be any suitable step for agglomerating the metal-containing material and the pyrite-containing material.

The agglomeration step may include mixing and agglomerating the metal-containing material and the pyrite-containing material.

The pyrite particles in the pyrite-containing material may have a particle size of $P_{80}$ of ≤1 mm.

The pyrite particles in the pyrite-containing material may have a particle size of $P_{80}$ of ≤250 μm.

The mixing step may be carried out before the agglomerating step.

The mixing and the agglomerating steps may be carried out simultaneously.

The leaching step may be any suitable leaching step.

The leaching step may be a heap leaching step.

The leaching step may include any suitable heap leaching steps that leach metal, such as copper or nickel or zinc or cobalt, from the heap of the agglomerates and recover metal.

In broad terms, the invention also provides a heap leaching method for a metal-containing material that contains a metal, such as copper or nickel or zinc or cobalt, or contains two or more of these metals, that is characterized by:

(a) leaching a heap of agglomerates of the metal-containing material and pyrite with a leach liquor, with the pyrite generating acid and heat that facilitates leaching metal from the metal-containing material, typically with the pyrite being in or obtained from a slurry containing pyrite, such as mine tailings; and (b) collecting a pregnant leach liquor containing the metal in solution from the heap.

The present invention also relates to a heap that leaches a metal, such as copper or nickel or zinc or cobalt, from a metal-containing material, the heap comprising:

(a) a heap of agglomerates of the metal-containing material and pyrite; and (b) a system that (i) supplies leach liquor to the heap so that the leach liquor flows downwardly though the heap and leaches the metal from the metal-containing material and (ii) collects a pregnant leach liquor containing the metal in solution from the heap, with the pyrite generating acid and heat in the heap that facilitates leaching the metal from the metal-containing material, with pyrite being in or obtained from a slurry containing pyrite, such as mine tailings.

BRIEF DESCRIPTION OF THE DRAWING

The invention is described further below by way of example only with reference to FIG. 1 which is a flow sheet of one embodiment of a method of recovering copper from a metal-containing material, such as a copper-containing material that has been categorized by a mine operator as being "non-economic" from the perspective of recovering copper from the material.

DESCRIPTION OF EMBODIMENT

The embodiment of the invention described below is described in the context of recovering copper from a metal-containing material.

It is noted that the invention is not confined to copper and extends to other metals such as nickel or zinc or cobalt.

The embodiment of the method of recovering copper from a copper-containing material, such as a copper-containing material that has been categorized by a mine operator as being "non-economic" from the perspective of recovering copper from the material, from a copper mine shown in FIG. 1 includes the steps of:
  (a) processing a slurry containing pyrite and removing pyrite therefrom;
  (b) forming agglomerates of the copper-containing material and pyrite from step (a);
  (c) leaching the agglomerates, with pyrite facilitating recovery of copper from the copper-containing material, and forming a copper-containing liquor; and
  (d) recovering copper from the copper-containing liquor.

The embodiment of the method of recovering copper from a copper-containing material in accordance with the invention shown in FIG. 1 is described in the context of the copper-containing material being in the form of waste rock, i.e. material that has been categorized by a mine operator as being "non-economic" from the perspective of recovering copper from the material. The copper-containing material may be as-mined material or stockpiled material.

In addition, the embodiment of the method of recovering copper from a copper-containing material in accordance with the invention shown in FIG. 1 is described in the context of the pyrite being a pyrite concentrate extracted from mine tailings.

It is understood that the invention is not confined to this embodiment and extends generally to any suitable copper-containing material and to any suitable source of pyrite.

Processing the Copper-Containing Material Prior to Forming Agglomerates—Steps 1, 2, 3

In the flow sheet shown in FIG. 1, the copper-containing material is in the form of waste rock having low grades of copper that has been re-mined from stockpiles 1.

As noted above, currently, these waste rock stockpiles are considered too low grade to be economically processed for recovering copper by known conventional methods.

As noted above, the invention is not confined to this source of copper-containing material.

The stockpiled waste rock 1 is transported in suitable vehicles, such as haul trucks or front-end loaders, for on conveyor belts or crushing and milling successively in primary, secondary and tertiary comminution circuits 2, 3 to the extent required to produce a suitable particle size distribution for the agglomeration step 4.

The comminution circuits 2, 3 may include single or multiple crushing steps delivering crushed copper-containing material to single or multiple milling and sizing steps to produce the comminution product stream having a desired particle size distribution for the agglomeration step 4.

The crushing steps 2, 3 may be carried out using any suitable combination of gyratory, cone and high pressure grinding roll (HPGR) crushers (not shown in the Figures).

The resultant comminuted material is transferred to the agglomeration step 4.

Agglomeration Step 4

The agglomeration step 4 agglomerates:
  (a) the comminuted material produced in steps 2 and 3; and
  (b) pyrite that, in this embodiment, is pyrite-containing concentrate obtained from tailings (see below).

The agglomeration step 4 may be any suitable agglomeration step using any suitable apparatus, such as agglomeration drums.

By way of example, required ratios of the comminuted material and the pyrite-containing concentrate are added to a mixing device and are mixed together, with or without a binder, with or without an acid, and with or without added water, and with or without recycled leach solution.

The required ratios depend on factors such as the amount of pyrite in the rock. Typically, a broad pyrite concentration range for the mixed product is from 1-10% pyrite.

The selection of the binder and the acid and the addition of water and/or recycled leaching solution are a function of a number of factors, including the characteristics of the comminuted material and the pyrite-containing concentrate and the required mechanical properties for the agglomerates.

The agglomeration step 4 may include any suitable protocol for adding and mixing the comminuted material and the pyrite-containing concentrate and the binder and water, if required.

The agglomerates are transferred to the heap leach steps described below.

Heap Leach, Downstream Solvent Extraction, and Electrowinning Steps 5, 6, 9, 10, 11, 12

The agglomerates are stored in a stack 5 and are conveyed from the stack 5 and formed into a heap 6 on a leach pad.

The heap 6 is provided with:
  (a) a leach liquor storage and delivery system to supply leach liquor to the heap;
  (b) a pregnant leach liquor collection system for collecting leach liquor containing copper in solution that is extracted from agglomerates in the heap; and
  (c) optionally, microbes (bacteria and archaea) to oxidise ferrous iron to ferric iron, with the ferric iron being an oxidant in the leaching process.

The pregnant leach liquor is processed in a solvent extraction system 9 that extracts copper from the liquor in an organic medium and then strips copper from the organic medium and produces a copper-containing solution.

The copper-containing solution is transferred to an electrowinning plant 10 and copper is recovered from solution.

The raffinate from the solvent extraction system 9 is regenerated and returned to returned to the heap as leach liquor. The leach liquor regeneration system includes a raffinate bleed limestone/lime neutralization 11 to control the build-up of impurities, generating neutralized solids for separate impoundment in a neutralization residue storage facility 12 or possibly co-impoundment with tailings.

The pyrite-containing concentrate in the agglomerates provides valuable sources of acid via the pyrite and heat.

The acid-generating properties of the pyrite mean that the amount of acid that has to be added to the leach liquor can be reduced to maintain a given leaching acid requirement.

In addition, when microbes are present, the microbial oxidation of pyrite produces acid and heat, all of which are beneficial for heap leaching the copper containing material.

Separation Steps 15, 16, 17, 18, 19, 20 for Pyrite-Containing Tailings

As noted above, the pyrite for the agglomeration step 4 is mine tailings.

Typically, the solids in the tailings are in the form of a slurry of (a) fines, with low concentrations of copper, typically less than 0.4 wt. %, more typically less than 0.3 wt. %, and (b) pyrite suspended in water. Typically, these are pyrite-containing particles and are slow to settle. The particles may also contain some copper.

The tailings are transferred, for example by being pumped, from a tailings dam or other suitable source of tailings 15 to a series of cyclones 16 or any other suitable size separation option that separates larger solids from the remaining fines-containing tailings.

The cyclones 16 may be any suitable cyclones.

The larger solids stream from the cyclones 16 are processed in a size reduction circuit, such as a milling/grinding/polishing circuit 17.

The output of this circuit is returned to the cyclones 16 for further processing in the cyclones.

The operating conditions of the cyclones 16 are selected so that the remaining tailings have a required particle size distribution for downstream processing of the tailings.

The remaining tailings from the cyclones 16 are transferred to a $1^{st}$ flotation circuit 18 and are processed in the circuit. Suitable flotation reagents are added to the circuit as required. The operating conditions, including reagents, are selected to float pyrite-containing particles.

The underflow from the $1^{st}$ flotation circuit 18 forms the abovementioned inert stream. As noted above, the term "inert" means that the stream is less reactive than the input slurry to the method in terms of the amount of pyrite in the stream. In the context of FIG. 1, this means that the underflow stream is less reactive than the pyrite-containing tailings supplied to the method in terms of the amount of pyrite in the stream. As noted above, this is beneficial because pyrite in tailings is an environmental problem because pyrite makes the tailings "acid generating tailings" and this is an issue for disposal of the tailings. The method provides an opportunity to produce an output that is environmentally safe for use in downstream applications. In the embodiment of FIG. 1, the underflow stream for the $1^{st}$ flotation circuit is transferred to a downstream neuralization step 11 described below The floated stream from the $1^{st}$ flotation circuit is transferred to and processed in a $2^{nd}$ flotation circuit 19.

The $2^{nd}$ flotation circuit 19 processes the floated stream from the $1^{st}$ flotation circuit. Suitable flotation reagents are added to the circuit as required. The operating conditions, including reagents are selected to float pyrite-containing particulates.

The underflow from the $2^{nd}$ flotation circuit is transferred back to the $1^{st}$ flotation circuit.

The pyrite-containing floated stream from the $2^{nd}$ flotation circuit is transferred to thickeners 20 and de-watered and forms a pyrite-containing concentrate.

The pyrite-containing concentrate is transferred to the agglomeration step 4 described above.

Advantages of the Embodiment Shown in FIG. 1

The advantages of the above-described embodiment shown in FIG. 1, and the invention generally, include the following advantages:

The method makes it possible to extract copper from a copper-containing material, such as a copper-containing material that has been categorized by a mine operator as being "non-economic" from the perspective of recovering copper from the material.

The method makes it possible to process tailings and thereby reduce the volumes of existing tailings dams. This is an important environmental outcome. Tailings present significant environmental and safety risks during the lives of mines. There are substantial issues involved in maintaining tailings dams and remediating tailings dams at the end of the lives of mines. In addition, there are potential issues with structural integrity of tailings dams. From time to time, there are catastrophic collapses of tailings dams that have caused loss of life and considerable damage to areas downstream of the dams. Also, tailings often contain contaminants (such as pyrite) which present challenges for mine remediation. Pyrite in tailings poses a potential environmental hazard because the tailings can oxidize to produce an acidic effluent that requires treatment to neutralize the acidity and remove contaminants before it can be discharged.

The acid and heat generating capacity of pyrite is an advantage in leaching, such as heap leaching, and, for example, can reduce the amount of added acid that is required in the leach liquor.

Moreover, the acid-generating capacity of pyrite means that the pyrite is used beneficially in the leach step and results in a net reduction in pyrite, which is significant from an environmental perspective.

It is noted that any amounts of copper in the pyrite-containing material is a bonus—it is taken into the heap with pyrite and can be recovered in the heap leaching step.

In addition to producing the abovementioned pyrite, removing pyrite from tailings produces an inert stream—i.e. a stream that is less reactive than the input tailings to the pyrite removal method in terms of the amount of pyrite in the inert stream. This is beneficial because pyrite in tailings is an environmental problem because pyrite makes the tailings "acid generating tailings" and this is an issue for disposal of the tailings.

The method can be operated with readily-available and tried and tested equipment.

The method makes it possible to process what has been previously classified as waste materials, such as low-grade copper-containing material or waste rock and tailings, and reduce the environmental impact of these materials as well as optimising the recovery of value from the originally-mined material.

Many modifications may be made to the flow sheet of FIG. 1 without departing from the spirit and scope of the invention.

By way of example, whilst the embodiment includes steps 1-3 to process waste rock to form the copper-containing material that is one feed for the agglomeration step 4, the invention is not confined to this combination of steps.

By way of further example, whilst the embodiment includes processing a slurry containing pyrite and removing pyrite therefrom, the invention is not limited to this option and extends to the use of any suitable source of pyrite.

For example, the invention extends to adding pyrite-containing tailings directly in agglomeration if they contain sufficient pyrite so that a pyrite removal step is not necessary, is an efficient use of these tailings.

The invention claimed is:

1. A method of recovering copper from a low-grade copper-containing material comprising the steps of:
   (a) obtaining a pyrite-containing slurry from a mine;
   (b) mixing (i) the low-grade copper-containing material and (ii) pyrite in, or obtained from, the pyrite-containing slurry and forming agglomerates;
   (c) heap leaching agglomerates from step (b) with a leach liquor and microbes, with pyrite generating acid and heat that facilitate recovering copper from the low-grade copper-containing material, and with the microbes oxidising ferrous iron to ferric iron, and forming a pregnant leach liquor containing copper; and
   (d) recovering copper in solution from the pregnant leach liquor.

2. The method defined in claim 1 wherein the low-grade copper-containing material is in the form of as-mined material or stockpiled material.

3. The method defined in claim 2 further includes comminuting as-mined or as-stockpiled material.

4. The method defined in claim 3 wherein comminuting further includes crushing as-mined or as-stockpiled material in one or more than one comminution circuit that reduces the size of the as-mined or as-stockpiled material.

5. The method defined in claim 4 wherein crushing further includes crushing as-mined or as-stockpiled material successively in primary, secondary and tertiary comminution circuits.

6. The method defined in claim 1 further comprising mixing the low-grade copper-containing material and the pyrite-containing slurry in step (b).

7. The method defined in claim 1 wherein the method includes, prior to step (b), removing pyrite from the pyrite-containing slurry.

8. The method defined in claim 7 wherein removing pyrite from the pyrite-containing slurry further includes producing pyrite in a concentrate form.

9. The method defined in claim 7 wherein removing pyrite from the pyrite-containing slurry forms (i) a pyrite-containing material and (ii) an inert stream.

10. The method defined in claim 1 wherein the mixing is carried out before forming agglomerates in step (b).

11. The method defined in claim 1 wherein mixing and forming agglomerates are carried out simultaneously in step (b).

* * * * *